(12) United States Patent
Kallio et al.

(10) Patent No.: US 7,620,389 B2
(45) Date of Patent: Nov. 17, 2009

(54) METHOD AND SYSTEM ALLOWING LAWFUL INTERCEPTION OF CONNECTIONS SUCH A VOICE-OVER-INTERNET PROTOCOL CALLS

(75) Inventors: Seppo Kallio, Tampere (FI); Markus Martin, Helsinki (FI); Martti Lumme, Espoo (FI); Jorma Seurujärvi, Lempäälä (FI); Antti Laurila, Tampere (FI)

(73) Assignee: Nokia Corporation, Espoo (FI)

( * ) Notice: Subject to any disclaimer, the term of this patent is extended or adjusted under 35 U.S.C. 154(b) by 308 days.

(21) Appl. No.: 10/477,630

(22) PCT Filed: May 16, 2001

(86) PCT No.: PCT/EP01/05583

§ 371 (c)(1),
(2), (4) Date: Dec. 31, 2003

(87) PCT Pub. No.: WO02/093838

PCT Pub. Date: Nov. 21, 2002

(65) Prior Publication Data

US 2004/0157629 A1    Aug. 12, 2004

(51) Int. Cl.
*H04M 3/42*    (2006.01)
(52) U.S. Cl. ............. 455/414.1; 455/433; 370/352; 370/250; 709/227; 709/224
(58) Field of Classification Search ............. 455/414.1, 455/433; 370/352, 250
See application file for complete search history.

(56) References Cited

U.S. PATENT DOCUMENTS 5,913,161 A    6/1999    Ozulkulu et al.
6,381,220 B1 *  4/2002    Kung et al. ............... 370/250
6,501,752 B1 * 12/2002    Kung et al. ............... 370/352
6,577,865 B2 *  6/2003    Dikmen et al. ........... 455/433
6,839,323 B1 *  1/2005    Foti .......................... 370/235
2002/0159442 A1 * 10/2002  Quigley et al. ........... 370/352

FOREIGN PATENT DOCUMENTS

| WO | WO 99/55062 | 10/1999 |
| WO | WO 00/42742 | 7/2000 |
| WO | WO0056029 | * 9/2000 |
| WO | WO 01/89145 A2 | 11/2001 |

OTHER PUBLICATIONS

"Independent review of the carnivore system", Smith et al, IIT Research Institute, Draft Report, Nov. 17, 2000, XP002902233, Contract No. 00-C-0328 IITRI CR-022-216.

* cited by examiner

*Primary Examiner*—Lester Kincaid
*Assistant Examiner*—Charles Shedrick
(74) *Attorney, Agent, or Firm*—Mintz, Levin, Cohn, Ferris, Glovsky and Popeo, P.C.

(57) ABSTRACT

The invention relates to a method and communication system allowing interception of a communication or connection of a target to be intercepted. According to preferred embodiments of the invention, interception triggering information is transmitted between the user plane and control plane (e.g. via Gr-, Gc-, Gi-interfaces). The system comprises at least one control means for handling signaling of a connection between a user equipment and another communication device, and a support element for transmitting traffic information between the user equipment and the another communication device. When the connection is to be intercepted, the control means is adapted to generate an interception information for informing the support element or another network element on an identification of the target to be intercepted. The support element is adapted to copy the traffic information to another network element for interception when receiving an interception information from the control means.

32 Claims, 12 Drawing Sheets

METHOD AND SYSTEM ALLOWING LAWFUL INTERCEPTION OF CONNECTIONS SUCH A VOICE-OVER-INTERNET PROTOCOL CALLS

FIELD AND BACKGROUND OF THE INVENTION

The invention relates to a method and system enabling interception of traffic between network elements, in particular in a case where the traffic is transported based on protocols adapted for internet-involving connections such as IP (Internet Protocol) or other type of packet-based protocols.

FIG. 12 shows a diagram of a system for lawful interception (LI) on the GPRS (General Packet Radio Service) plane. Apart from the elements 24, 25, 42, the network structure and network elements are in accordance with known standards or proposals.

In this application LIGs contain Administration Function (ADMF), Delivery Function 2 (DF2) and Delivery Function 3 (DF3), or as in FIG. 7 DF3 is integrated to network elements.

A network element 1, e.g. a terminal equipment TE and/or a mobile terminal MT of a subscriber, is connectable to the mobile network via a radio access network 2 which, according to FIG. 11, is implemented as a UMTS radio access network (UTRAN) but may also be a radio access network of other type. The system further comprises a home subscriber server (HSS) 4, one or more serving support nodes (SGSN, Serving GPRS Support Node) 8, one or more gateway nodes (GGSN, Gateway GPRS Support Node) 11, one or more call state control functions (CSCF) 16, one or more media gateway control functions (MGCF) 17, and cooperates with, or includes one or more network elements 18 for providing applications and services (APPSE). The network element 18 includes one or more service control points (SCP).

The system further comprises SGWs 28 (Transport Signaling Gateway), MGWs (Media Gateways) 29, MRF (Multimedia Resource Function) 30 and provides connections to other networks such as PSTN (Public Switched Telephone Network), legacy/external network 41, a virtual private network (VPN 42), multimedia IP networks 43 and legacy signaling network 44, etc.

As shown in FIG. 11, for performing lawful interception (LI), a Lawful Interception Gateway (LIG) 24 is provided which may be connected to or cooperate with a Law Enforcement Agency (LEA) 25 and may be connected to the support nodes 8 and/or 11 for intercepting traffic between a network element to be intercepted (e.g. network element) and another called or calling terminal. The elements involved in lawful interception are marked by hatched lines. In FIG. 11, the dual line represents "control, call related information and call content". The continuous single line represents "signaling and data transfer".

The system shown in FIG. 12 is able to intercept GPRS-based normal communications. However, a problem arises when interception is to be conducted with an internet-protocol-type connection such as a VoIP (Voice over IP) connection. GGSNs 11 normally do not recognise VoIP subscribers with IPT (IP telephony) identity. GPRS interception can therefore presently only be used for GPRS connections but not for VoIP connections.

In particular when the intended lawful interception (LI) does not relate to the user identity on the transport level (i.e. the ID's used by GPRS) but only to user identities used in the IM (Internet Multimedia) subsystem which are only known to the CSCF 16 (e.g. firstname.surname@sip.some operator.com.), the support nodes 8 and/or 11 do not have information for identifying the call and call contents to be intercepted.

As an example, if the voice calls of a subscriber are to be intercepted, the GPRS support nodes may not be able to identify the calls by only relying on the PDP (Packet Data Protocol) contexts.

SUMMARY OF THE INVENTION

The invention provides a method and/or system with enhanced possibility of intercepting connections such as calls which are based on protocols adapted for internet or similar type.

The present invention provides a method and/or system as defined in the independent claims or any of the dependent claims.

In accordance with a preferred embodiment of the invention, a control means such as CSCF is adapted to trigger an interception and has the necessary call-related information to identify the connections to be intercepted. The control element informs one or more of the support nodes such as SGSN or GGSN which PDP contexts should be intercepted. As an example, typically the call-related information should be reproduced or copied in a voice call interception will be interpreted in the control element while it is just another PDP context on the GPRS level. Therefore, an interaction between the control element and a support node is provides so that an interception can also be performed in a case where the interception does not relate to the user identity on the transport level but only to the identity used on other levels such as in the IM subsystem. The control element thus is able to inform the support nodes such as GGSN to monitor VoIP subscriber's call contents.

Otherwise stated, according to preferred embodiments, it is the application which runs on top of the services provided by the GPRS layer which will be intercepted and not every application used by the subscriber to be intercepted.

According to some of the preferred embodiments interception triggering information is transmitted between the user plane and control plane (e.g. via Gr-, Gc-, Gi-interfaces).

As a general concept, a control element such as CSCF or HSS informs one or more support network elements such as GGSN or SGSN to start sending user plane data to an intercept structure, e.g. a LIG.

The control means is able to inform a support node such as GGSN to monitor the subscriber's call content, e.g. of a VoIP call, in a standardised way.

The proposed solution offers the control means such as CSCF a standardised possibility to intercept VoIP call content using the existing GPRS solution implemented in GGSN. Gi interface may be a standardised interface.

The invention introduces several alternatives of call interception in an All-IP (Internet Protocol) environment.

In one of the solutions, call content is intercepted from GGSN and call related information (reports) from CSCF and/or from application servers. The call control signaling may be put through SGSN and GGSN in one PDP context, and CSCF is the first to recognize that the subscriber is to be monitored. CSCF is able to inform GGSN to copy the actual media, i.e. user traffic (both directions if needed) also to interception equipment, in addition to forwarding the actual media to the called terminal's address, in particular IP address.

The invention may e.g. be used in an IP concept involving CPS and GGSN.

The solution proposed according to the invention is advantageous over a theoretical alternative way of sending the triggering information via the LEA which would otherwise be required if the core network (SGSN and/or GGSN) and the control plane (CPS and HSS) are of different type, e.g. from different producers. The proposed solution is a faster way to trigger the interception.

In accordance with an implementation of the invention, the LI in an All-IP Network (interception of VoIP 'calls' etc.) may be triggered in HSS and in CPS by setting appropriate triggers or trigger detection points in these elements.

The interception is preferably triggered from the IPT Identity. The IPT Identity may e.g. be: IMSI, alias (e.g. user_id@domain_id), E.164 number (MSISDN), or IP address.

When the user plane does not have knowledge about alias, it can at least provide triggering to other identities used in the user plane.

The IRIs (Intercept Related Information) from the control plane and CC (Content of Communication) from the user plane have to be bound together, i.e. correlated. In the embodiments shown in the drawings, Interception ID is preferably used as correlation ID.

Another possible correlation ID can be the call-related ID for charging purposes. This ID will be used in control and user plane.

In further embodiments, the triggering information is assumed to be available in Gr and Gc interfaces, because HSS can get alias-related IMSI, MSISDN, PDP context, IP address and maybe IMEI.

The triggering information is preferably provided also in Gi interface e.g. in case of terminated or forwarded party being a target for interception, when the SCP (Service Control Point) has only the subscriber's alias and MSISDN information.

If the charging ID cannot be used as a correlation information, the correlation ID should be delivered to the SGSN and GGSN with a LI trigger (in Gr, Gc and Gi interfaces).

The delivery of the CC content to the LEA is preferably performed in accordance with standards and national laws (separation of directions, in speech or in data packets, etc.).

If the used codec information is not available in the SGSN or in the GGSN, CPS preferably delivers it to the LIG.

If the context contains packets from several "calls", SGSN, GGSNor LIG preferably filters off packets not to be intercepted.

Control and IRI interfaces between LIG-CPS and between LIG-HSS are preferably provided.

DETAILED DESCRIPTION OF PREFERRED EMBODIMENTS OF THE INVENTION

The drawings illustrate LI scenarios with GPRS access. In case of other access (e.g. WLAN), the LI or at least copying the CC from the access is adapted accordingly.

In a preferred embodiment, for LI, in particular VoIP interception, the LI trigger is transmitted from HSS and CPS at least when the used identity is alias or other IPT identity which is not in user plane knowledge.

In Gi interface, the intercepted subscriber MSISDN or IP address is used to identify the intercepted context. Interception equipments (LEAs) IP address may also be used depending on the solution. CSCF may use the Gi interface to control VoIP interception in GGSN.

This invention presents at least three different implementations how the interception is carried out after the information about the IP address is passed over the Gi interface.

1) GGSN picks up an IP address of LEA (Law Enforcement Agency) from CSCF over the Gi interface and sends copies of all data packets also to that address. Signaling traffic is sent from CSCF to LIG (Lawful Interception Gateway) which then forwards them to LEA.

2) GGSN picks up an IP address of IF over the Gi and copies all data packet there. LIG then forwards data packets via MGW (Media GateWay) to LEA. Signaling traffic is similar as in case 1.

3) This is similar to case 2, but there the data traffic is sent directly from LIG to LEA, not via MGW.

The problem may also be solved without CSCF and GGSN communicating. In this case, the CSCF may forward the IP address to LIG, which then handles the interception similar to known GPRS-based Interception.

As a basic information to the embodiments shown in FIGS. 1 to 9, HSS has knowledge about subscriber's all IPT identities but CPS has only knowledge about subscriber's alias and MSISDN.

Figure 1:
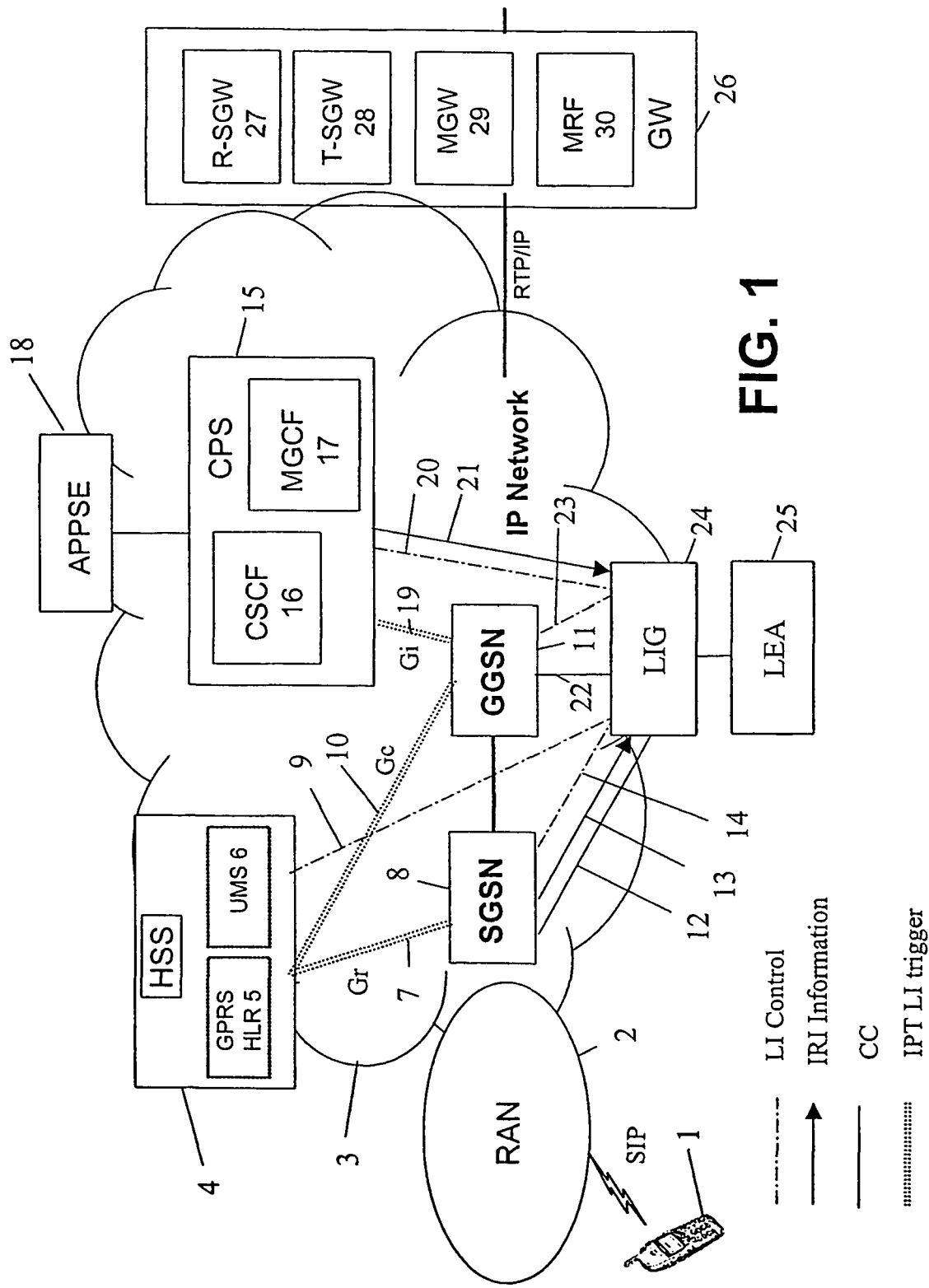
FIG. 1 illustrates a first embodiment of the invention.

FIG. 1 shows a first embodiment of a method and system in accordance with the present invention. The same reference numerals as in FIG. 12 have been assigned to network elements similar to the network elements shown in FIG. 12 and described above. A mobile terminal 1 can get access and be attached to a network 3, preferably an IP network, via a radio access network RAN 2 which may correspond to UTRAN of FIG. 12 or be based on a GPRS standard, etc. The network 3 comprises one or more serving support nodes 8 (SGSN=Serving GPRS Support Node) and one or mode gateway support nodes 11 (GGSN=Gateway GPRS Support Node). A home subscriber server HSS 4 includes a home location register (HLR) 5 and a user mobility server (UMS) 6.

A call processing server (CPS) 15 of network 3 comprises a call state control function (CSCF) 16 and a media gateway control function (MGCF) 17 and is adapted to cooperate with the applications and services component (APPSE) 18. The network 3 communicates with other networks or components (not shown) via a gateway 26 using an internet protocol such as RTP (Real Time Protocol). The gateway 26 includes a roaming signaling gateway function (R-SGW) 27, a transport signaling gateway function (T-SGW) 28, a media gateway (MGW) 29, and a multimedia resource function (MRF) 30. Further, the structure shown in FIG. 1 includes a lawful interception gateway (LIG) 24 which is adapted to communicate with a law enforcement agency (LEA) 25.

The structure shown in FIG. 1 allows a legal interception of IP-based connections between a user equipment such as mobile terminal 1 and another terminal equipment, e.g. of a called or a calling party. According to the structure of FIG. 1, standardised interfaces Gr, Gc, Gi may be used, in particular when all components necessary for interception are provided by the same supplier or producer.

In the embodiment shown in FIG. 1, the double-dotted lines 7, 11, 19 illustrate connections for providing and transmitting trigger information for triggering the interception in case of an IP telephony (IPT) or other type of connection to be intercepted. The trigger information will be sent to SGSN 8 and/or GGSN 11 when an interception is to be started. The trigger information will be sent from HSS 4 to SGSN 8 via interface Gr and link 7, and/or to GGSN 11 via interface Gc and link 10, and/or from CPS 15 to GGSN 11 via interface Gi and link 19.

The dot-and-dash lines 9, 14, 20 and 23 shown between HSS 4, SGSN 8, CPS 15 and GGSN 19, respectively, on the one hand, and LIG 24, on the other hand, illustrate the interception control, i.e. transmission of the control information, control commands and the like necessary for lawful interception control. The solid lines 12 and 22 shown between SGSN 8 and GGSN 11, on the one hand, and LIG 24 on the other hand represent CC (Content of Communication) which is sent to LIG 24 for interception. The arrow-headed lines 13, 21 illustrate the flow of IRIs (intercept-related information).

In case the interception is handled by SGSN 8 alone without involving GGSN 11, the links/connections 22, 23 between GGSN 11 and LIG 24 can be omitted. Vice-versa in case the interception is handled by GGSN 11 alone, links and information flows 12 to 14 between SGSN 8 and LIG 24 can be omitted. For enhancing quality and success rate of interception, all links/information flows shown in FIG. 1 may also be provided in parallel between SGSN 8 and GGSN 11 on the one hand, and LIG 24, on the other hand.

In the embodiment shown in FIG. 1, the triggering information is available in Gr and Gc interfaces and is provided by HSS 4 which gets alias-related IMSI, MSISDN, PDP context, IP address and/or possibly IMEI.

In FIG. 1, the triggering information may preferably also be provided in the Gi interface, in particular in a case when a terminated or forwarded party is the interception target.

Stated more generally, in the solution according to FIG. 1, the control and user planes are composed of elements of the same producer, and all Gr, Gc and Gi interfaces are standardised interfaces. In more detail, HSS 4, CPS 15, SGSN 8, GGSN 11 and LIG 24 are from the same producer and are in the same VPN (Virtual Private Network).

LIG 24 controls triggers (i.e. delivers IPT identities activation information) in the HSS 4 and in the CPS 15. HSS 4 will trigger the interception from the IPT identity. HSS 4 can set the LI trigger for all IPT identities but at least the alias triggering is needed. HSS 4 will map the triggered IPT ID to such a format (IMSI [default], MSISDN, IMEI or IP address) that LIG 24 or SGSN 8 or GGSN 11 will recognize it. HSS 4 will send the mapped LI trigger and correlation ID (if charging ID is not enough to bind IRIs and CC together) to the SGSN 8 and/or GGSN 11 directly (via Gr, Gc).

If Gr, Gc and Gi interfaces are used, the trigger and possible correlation information is preferably standardised to those interfaces. If it is necessary to carry IPT identity (and PDP context ID) or the mapped LI trigger and correlation ID (if charging ID is not enough to bind IRIs and CC together) from HSS 4 to SGSN 8 and GGSN 11 via Gr and Gc and from CPS 15 to GGSN 11 via Gi for other reason than interception (e.g. charging or statistic) those interfaces can be standardised. With those Gr, Gc and Gi standards the IPT identity or mapped LI trigger can be used as a LI triggering key in SGSN and GGSN.

SGSN 8 and/or GGSN 11 will send the CC (containing also correlation ID, charging ID or other correlation ID) to the LIG 24. SGSN 8 and CPS 15 wil send IRI information to the LIG 24.

Some IPT identities are in CPS knowledge (alias and MSISDN) so CPS 15 can trigger the LI and send the trigger key to the GGSN 11 e.g. in case a terminated or forwarded party is a target for interception. CPS 15 will send all communication related IRI information (containing also correlation information) to the LIG 24. IRI information can be sent to the LIG also from the HSS if it is needed. Such a information can be e.g. location information if it is not known in SGSN 8 or CPS 15.

LIG 24 will create the reports for LEA and will separate user medias from the CC if it is requested by the authority or standards.

Figure 2:
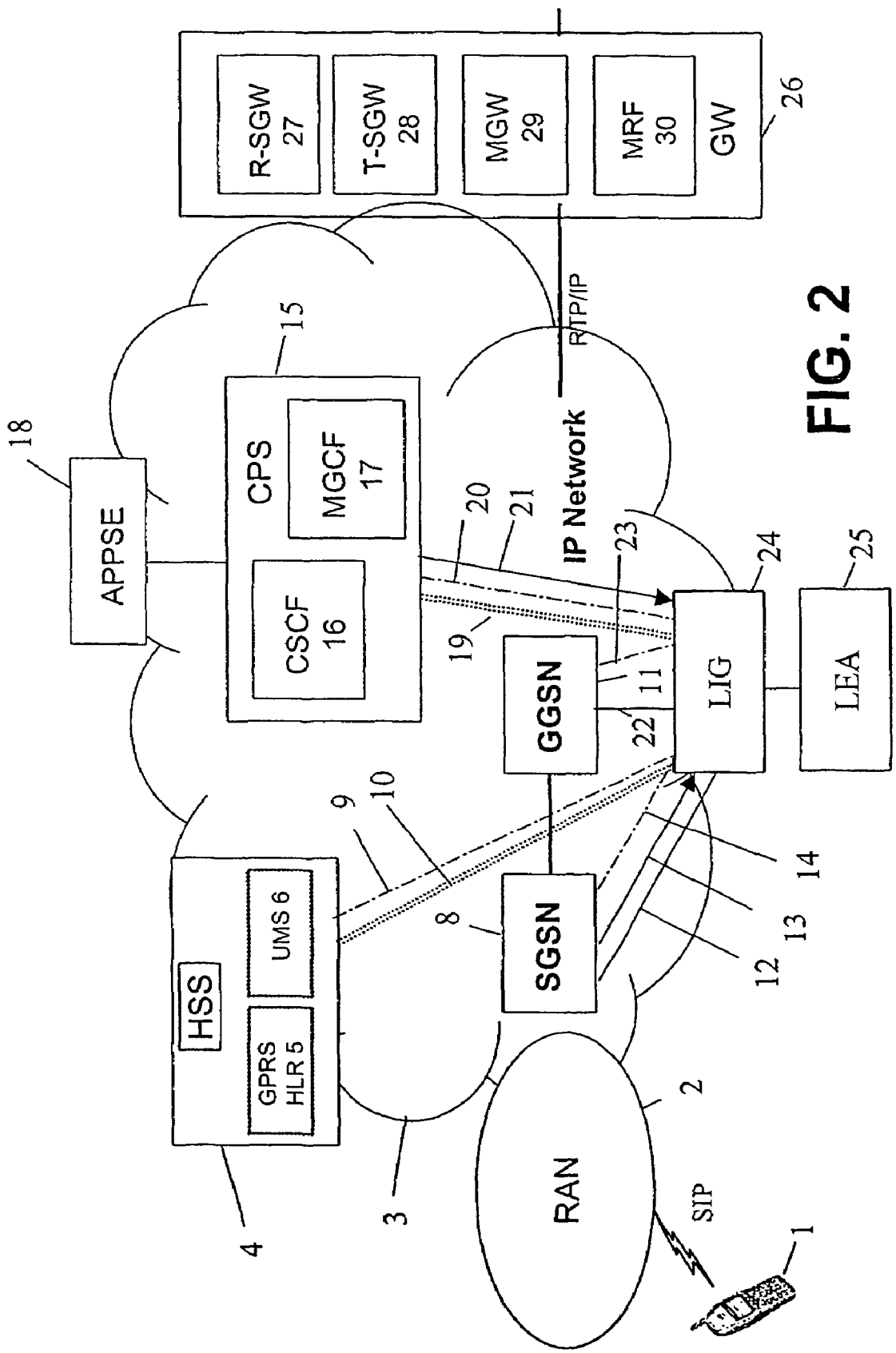
FIG. 2 illustrates a second embodiment of the present invention.

FIG. 2 illustrates a further embodiment of the invention. In this and all further embodiments shown in FIGS. 3 to 9 the same reference numerals are assigned to components having the same or essentially the same structure or functioning as the components shown in FIG. 1 or 12. All above explanations regarding these components, their functioning and possible alternatives likewise apply to the components shown in FIGS. 2 to 9 (unless otherwise stated below) and are therefore not repeated again.

The embodiment shown in FIG. 2 differs from the embodiment of FIG. 1 in that no standardised interfaces Gr, Gc, Gi between HSS 4 and SGSN 8, GGSN 11, and between CPS 15 and GGSN 11 are provided or used for interception. According to FIG. 2 the trigger information (information flow 10) is sent from HSS 4 directly to LIG 24 instead to GGSN and SGSN 8 (as shown in FIG. 1).

Likewise, the trigger information (information flow or link 19) is directly sent from CPS 15 to LIG 24 (instead to GGSN 11 as in FIG. 1). The other information flows or connections 9, 12 to 14, and 20 to 23 are similar to the embodiment of FIG. 1. That is, the interception control (dot-and-dash lines 9, 14, 20, and 23), the IRI information flow (lines 13, 21), and the CC flow (lines 12, 22) are the same as in FIG. 1.

In this embodiment, the LIG 24 informs the SGSN 8 and/or GGSN 11 on the address or other identification of the party or equipment to be intercepted.

In the embodiment of FIG. 2, the control and user planes (HSS, CPS, SGSN, GGSN and LIG) are composed of elements of the same producer, and both Gr and Gc are non-standardised interfaces. HSS, CPS, SGSN, GGSN and LIG are in the same VPN.

LIG 24 controls triggers in the HSS 4 and in the CPS 15 (delivers IPT identities activation information to these elements). HSS 4 will trigger the interception from the IPT identity. HSS can provide the trigger for all IPT identities but at least the alias triggering is necessary. HSS 4 will map the triggered IPT ID to a format (IMSI [default], MSISDN, IMEI or IP address) that LIG or SGSN or GGSN can recognize. HSS will send the mapped LI trigger (e.g. IMSI) and correlation ID (if charging ID is not enough to bind IRIs and CC together) to the SGSN and/or GGSN via LIG.

If Gr, Gc and Gi standards do not support IPT identity and/or mapped LI trigger and/or possible correlation ID, the LI 24 is triggered via LIG 24, in particular in a case when standards are against delivering LI information in open interfaces (e.g. in USA). In such a case HSS 4 and CPS 15 will send the mapped LI trigger and correlation ID (if charging ID is not enough to bind IRIs and CC together) to the LIG 24. LIG 24 will send the LI trigger immediately to the SGSN 8 and/or GGSN 11.

SGSN or/and GGSN will send the CC (containing also correlation ID, charging ID or other correlation ID) to the LIG. SGSN, CPS and possible HSS will send IRI information to the LIG.

Some IPT identities are known to CPS 15 (alias and MSISDN) so it can trigger the LI and send the trigger key to the GGSN e.g. in case of terminated or forwarded party being a target for interception. CPS will send all communication related IRI information (containing also correlation information) to the LIG. IRI information can be sent to the LIG also from the HSS if it is needed. Such an information can be e.g. location information if it not known in SGSN 8 or CPS 15.

LIG will create the reports for LEA and will separate user medias from the CC if it is requested by the authority or standards.

One of the advantages of FIG. 2 is the fact that no standardised interfaces or other communication between HSS 4, SGSN 8, GGSN 11, and CPS 15 are necessary for starting, controlling and performing interception.

Figure 3:
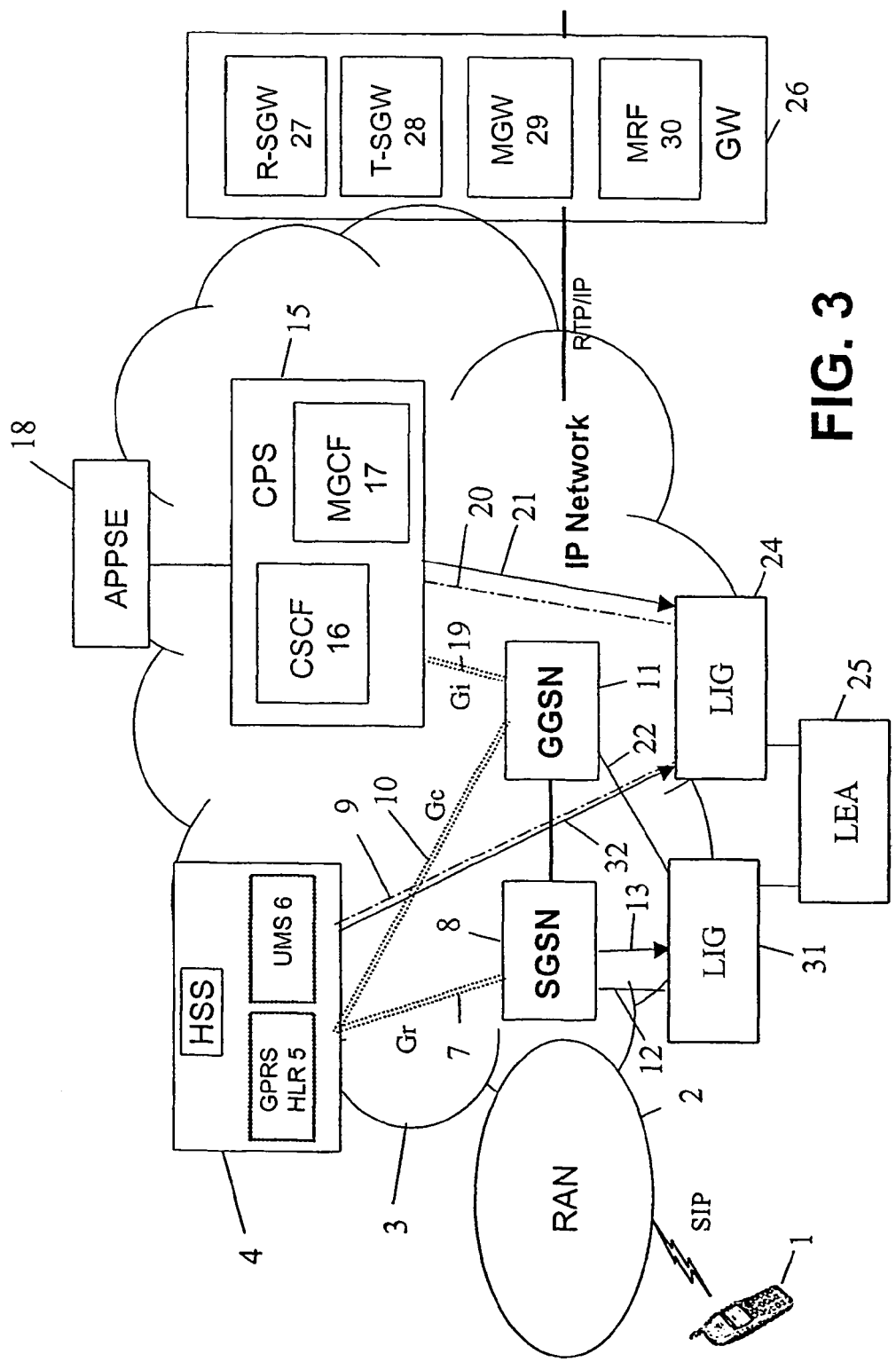
FIG. 3 illustrates a third embodiment of the present invention.

FIG. 3 shows a further embodiment in accordance with the present invention which includes, in addition to the components of the embodiment shown in FIG. 1, an additional lawful interception gateway (LIG) 31 which is adapted to communicate with LEA 25, similar to LIG 24. The embodiment according to FIG. 3 allows a VoIP LI with control of LI by LIG 24, and actual performing of the LI by LIG 31. According to the embodiment of FIG. 3, the identification information (IRI information) is sent to LIG 24 from HSS 4 (information flow or link 32), and from CPS 15 (information flow or link 21). In addition, similar to the embodiment of FIG. 1, the LI control information (lines 9, 20) is sent from HSS 4 and CPS 15 to LIG 24. The CC information is directly sent to LIG 31 from SGSN 8 and/or GGSN 11 (lines 12, 22). According to FIG. 3, the IRI information is directly sent from SGSN 8 to LIG 31 to inform the latter on the address or other identification of the party or equipment to be intercepted.

The embodiment of FIG. 3 is of advantage in that it enables a distinction between LI control and actual interception of communication content. The LIG 31 may be a gateway of any type which must simply be able to communicate with SGSN 8 and/or GGSN 11 but does not require to communicate, or be able to communicate, with HSS 4 and/or CPS 15. For instance, different LIG components 24, 31 produced by different producers may be used. As in FIG. 1, the structure of FIG. 3 preferably provides standardised interfaces Gr, Gc, Gi for allowing a proper communication between HSS 4, SGSN 8, GGSN 11 and CPS 15.

In the scenario according to FIG. 3, IPT identity or LI trigger (and PDP context ID) and possible correlation ID are carried from HSS to SGSN and GGSN via Gr and Gc interface, and from CPS to GGSN via Gi also in other cases than interception (e.g. charging or statistic). The carrying manner may be standardised. IPT identity or LI trigger (e.g. IMSI) can be used as a LI triggering key in SGSN 8 and GGSN 11. Note that the trigger in the Gi interface can be only the alias or MSISDN (only they are known to CPS 15).

HSS 4, CPS 15 and LIG 24 are preferably from the same producer or supplier, and. LIG 31 is from a different producer or supplier. HSS 4, CPS 15 and LIG 24 are in the same VPN.

Here is assumed that Charging ID can be used as a correlation information with user identity (e.g. IPT identity). Otherwise also correlation ID is preferably standardised to the Gr, Gc and Gi interfaces.

LIG controls triggers in the HSS 4 and in the CPS 15 (deliver IPT identities activation information). IRI information can be sent to the LIG also from the HSS if it is needed. Such a information can be e.g. location information if it is not in CPS's knowledge.

HSS will trigger the interception from the IPT identity. HSS can make the LI trigger (e.g. IMSI) from all IPT identities but at least the trigger from alias (user@domain) is needed. HSS will send the LI trigger to the SGSN and GGSN directly (Gr, Gc). CPS will trigger the interception e.g. in case of terminated or forwarded party being a target for interception and will send trigger key (alias or MSISDN) to the GGSN.

One supplier may produce IRIs from the control plane (HSS and CPS) and the other supplier may produce LI trigger related (trigger in Gr and Gc) CC and possible IRIs to the LEA.

Figure 4:
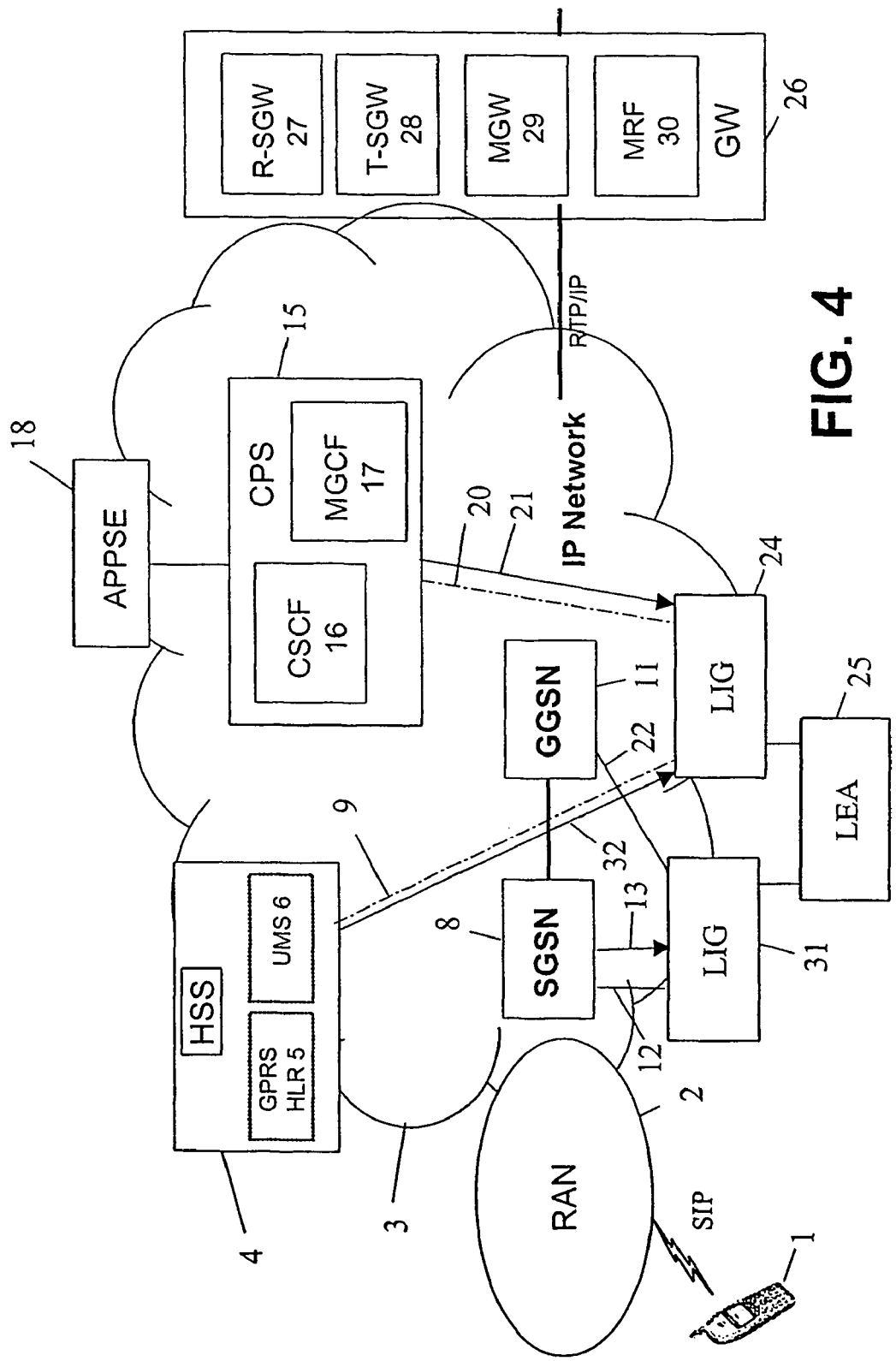
FIG. 4 illustrates a fourth embodiment of the present invention.

The embodiment of FIG. 4 essentially represents a combination of the embodiments of FIGS. 2 and 3 and does not require any standardised interfaces between HSS 4, SGSN 8, GGSN 11 and CPS 15. The additional LIG 31 and the LIG 24 operate in the same manner as shown and described with regard to FIG. 3 and receive the same information as in the embodiment of FIG. 3.

In this embodiment of FIG. 4, Gr and Gc interfaces have non-standardised IPT ID or LI trigger correlation ID information.

HSS 4, CPS 15 and LIG 24 are from one vendor and are in the same VPN.

Here, the Charging ID or other standardised ID which is used in both control and user plane is used as a correlation ID with user identity (e.g. IPT identity or IMSI).

LIG 24 controls triggers in the HSS 4 and in the CPS 15 (deliver IPT identities activation information). IRI information can be sent to the LIG 24 also from the HSS 4 if it is needed. Such an information can be e.g. location information if unknown by CPS 15.

HSS 4 and CPS 15 will trigger the interception from the IPT identity. HSS 4 and CPS 15 will send IRIs containing IPT identity or LI trigger and correlation ID (and PDP context) to the LIG 24.

IRIs will be produced from the control plane (HSS and CPS). The CC and possible IRIs will be produced and transmitted from SGSN and/or GGSN to the LEA, and will only be related to other IPT identities (IMSI, MSISDN and IP address) than alias.

Figure 5:
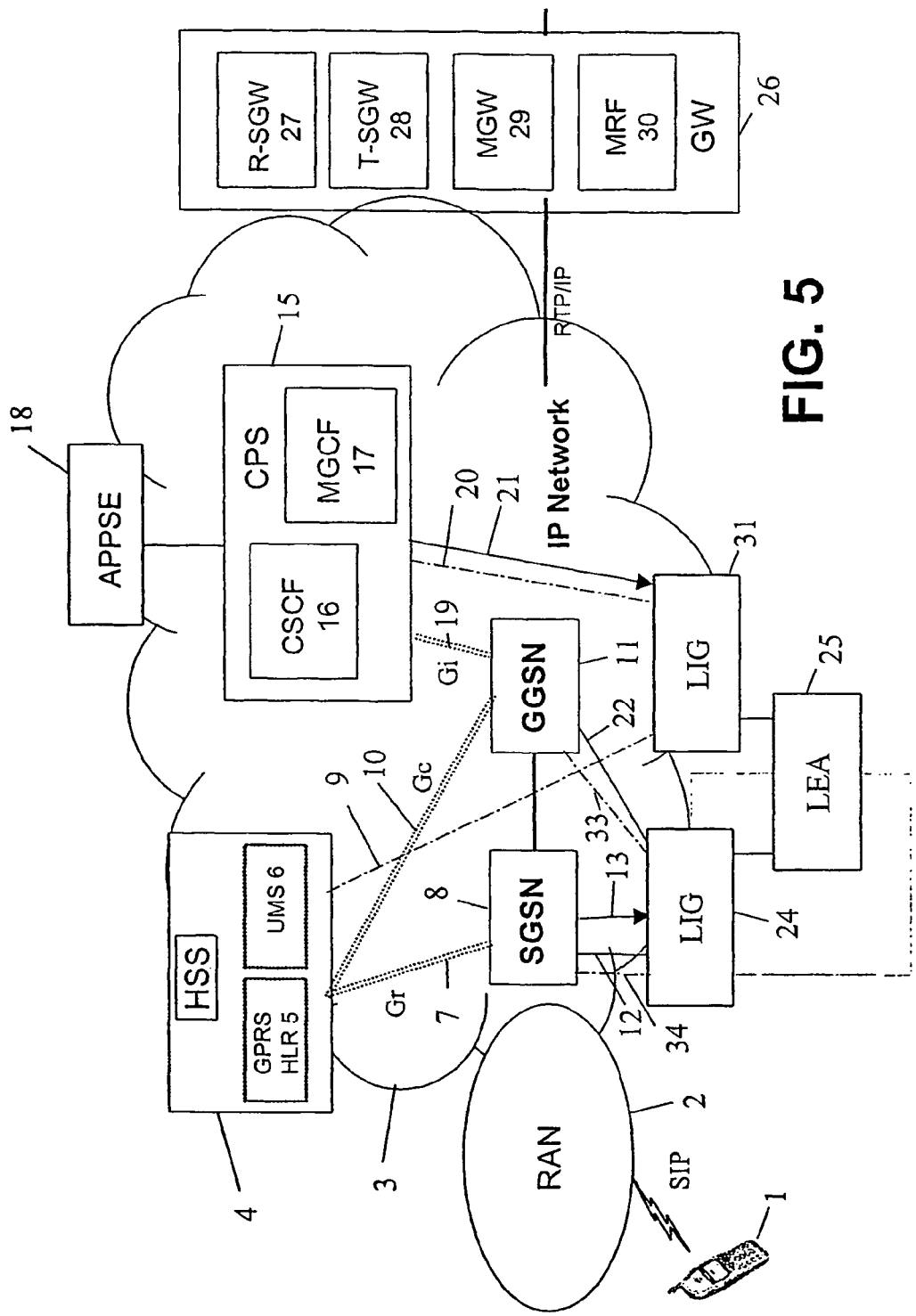
FIG. 5 illustrates a fifth embodiment of the present invention.

In FIG. 5, the gateways 24, 31 are exchanged as compared to the arrangement of FIG. 4. According to FIG. 5, an additional LI control flow or link 33 is provided between GGSN 11 and LIG 24. Moreover, standardised interfaces Gr, Gc, Gi are provided, similar to FIG. 1, between HSS 4, SGSN 8, GGSN 11 and CPS 15.

According to FIG. 5, IPT identity (and PDP context ID) and possible correlation ID are carried from HSS to SGSN and GGSN via Gr and Gc interfaces and from CPS to the GGSN via Gi interface for other reason than interception (e.g. charging or statistic) and in a standardized manner. IPT identity can be used as a LI triggering key in SGSN and GGSN.

SGSN 8, GGSN 11 and LIG 24 are in the same VPN.

Here, Charging ID is used as a correlation information with user identity (e.g. IPT identity). Other correlation information is preferably standardised to the Gr and Gc interfaces.

LIG 24 controls triggers (IPT identity) in the SGSN and in the GGSN. If Gr, Gc and Gi will support only the trigger mapped from the IPT identity e.g. IMSI, SGSN 8 and GGSN 11 cannot start interception related to alias (user@domain) Preferably, also SGSN 8 and GGSN 11 know IPT identities, because it is possible that neither the LEA 25 nor the LIG 24 know the alias correspondence.

HSS will trigger the interception from the IPT identity. HSS can make the LI trigger represented by any needed identity (IMSI, E.164, IP address, IMEI and IPT identity). In this scenario, the Gr and Gc interfaces are informed on the IPT identity itself.

IRIs and CC will be produced from the user plane (SGSN and GGSN) and IRIs will be produced from the control plane.

To ensure the reliability of the interception in a case where SGSN and GGSN cannot reliably start the interception related to IPT identity, IPT identity is set and known in HSS 4, CPS 15, SGSN 8, GGSN 11 and LIG 24, 31, because the target can communicate with other user's UE (User Equipment) by using his own alias (user@domain).

Figure 6:
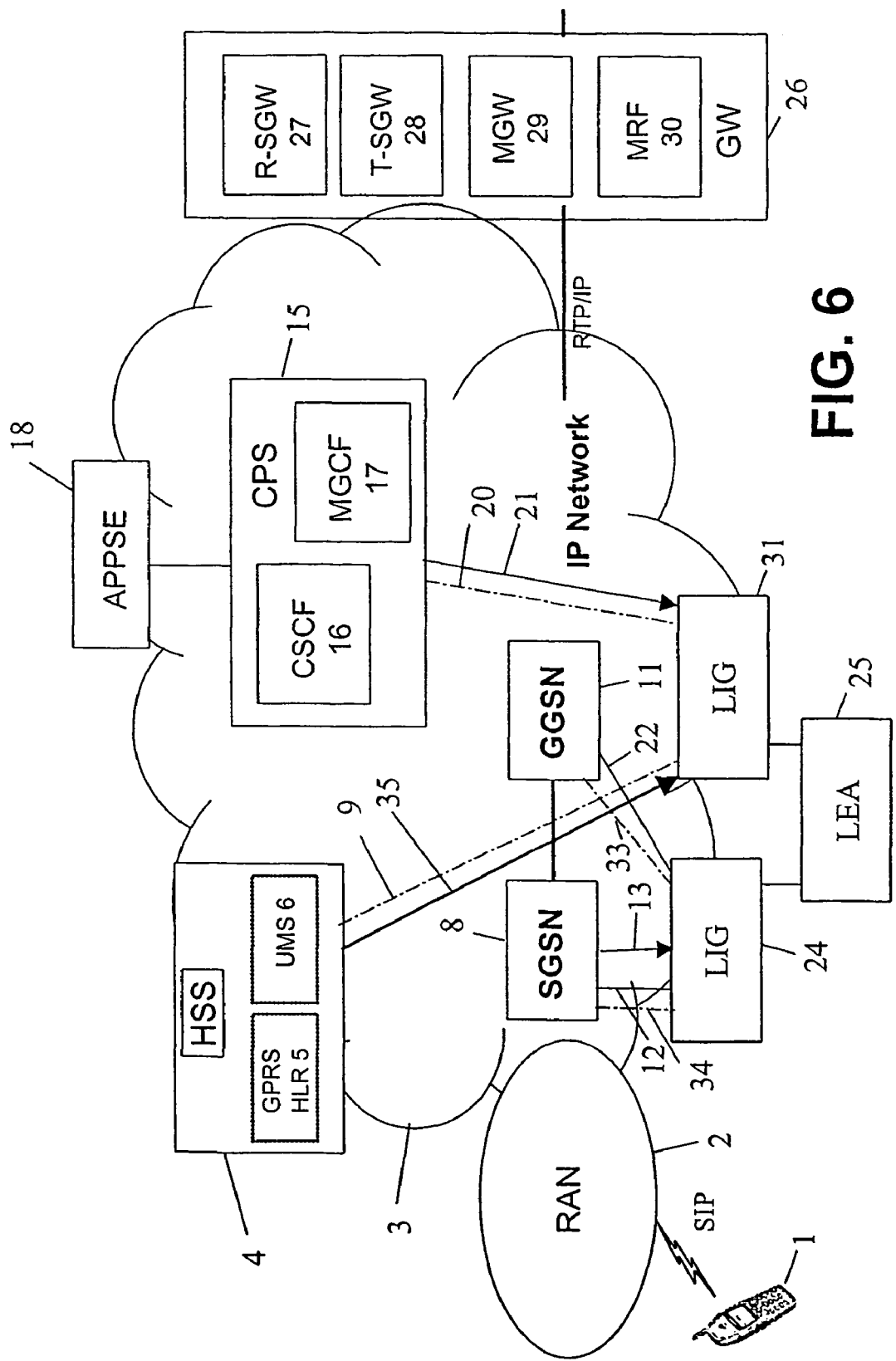
FIG. 6 illustrates a sixth embodiment of the present invention.

FIG. 6 illustrates an embodiment having a similar structure as the embodiments of FIGS. 4 and 5, but without the need of standardised interfaces Gr, Gc, Gi. An additional IRI information link 35 is provided between HSS 4 and LIG 31. Further, a control link 34 is present between SGSN 8 and LIG 24. Such a link is already provided in the embodiment of FIG. 5.

The structure of FIG. 6 provides VoIP LI with a core network made of components of e.g. the same producer, as well as an additional LIG 31 which may be provided by another producer. Non-standardised interfaces may be provided without problems because of the shown information flows.

According to this embodiment, Gr and Gc interfaces have non-standardised IPT ID (nor PDP context) information.

SGSN 8, GGSN 11 and LIG 24 are in the same VPN.

Here, the Charging ID is used as a correlation information with user identity (e.g. IPT identity, at least in control plane LI).

CC and IRIs will be produced from the user plane (SGSN and GGSN) and IRIs will be produced from the control plane. CC and IRIs can be produced from the SGSN and GGSN related to other IPT identity (IMSI, MSISDN and IP address) than alias.

Figure 7:
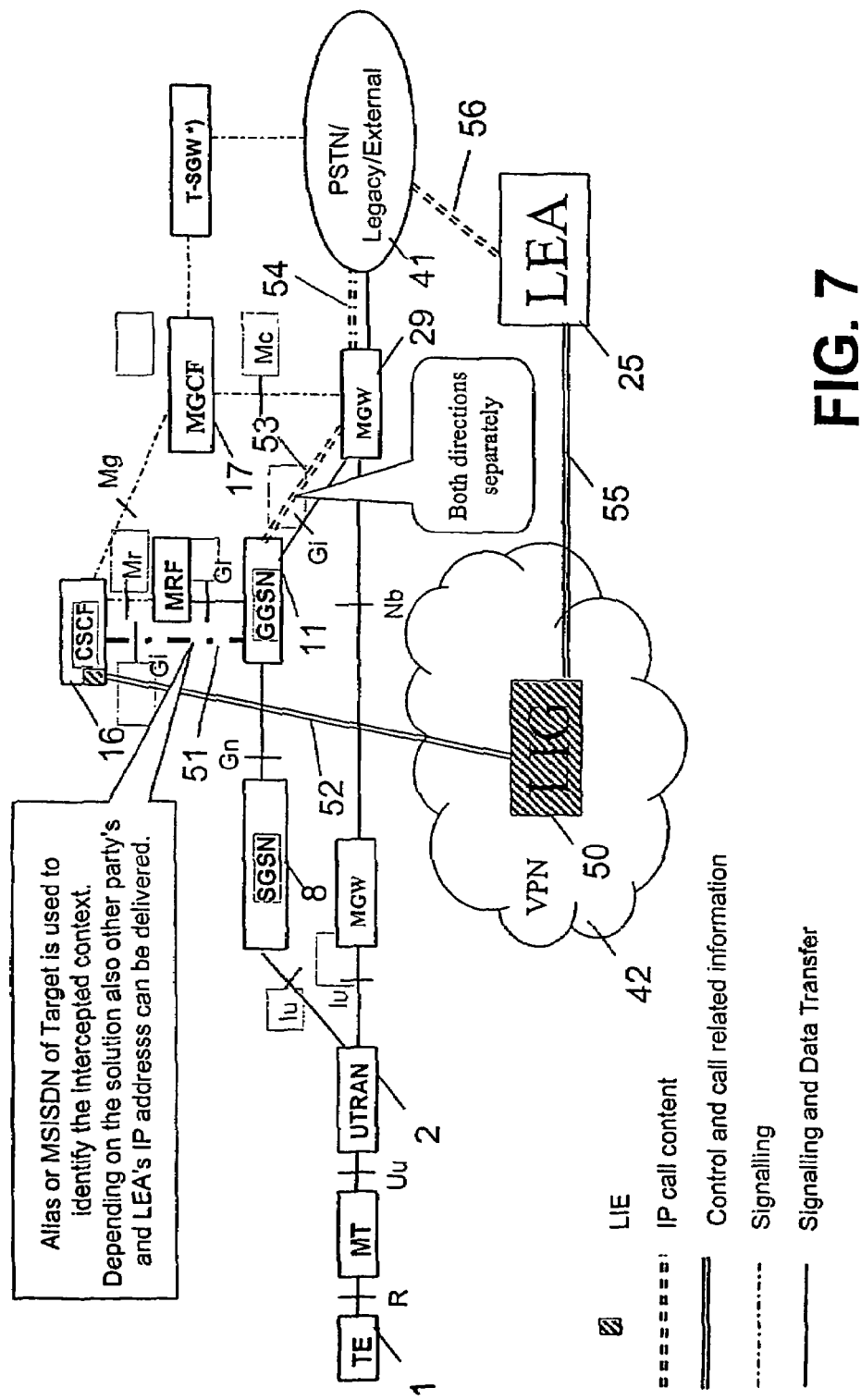
FIG. 7 illustrates a seventh embodiment of the present invention.
Figure 8:
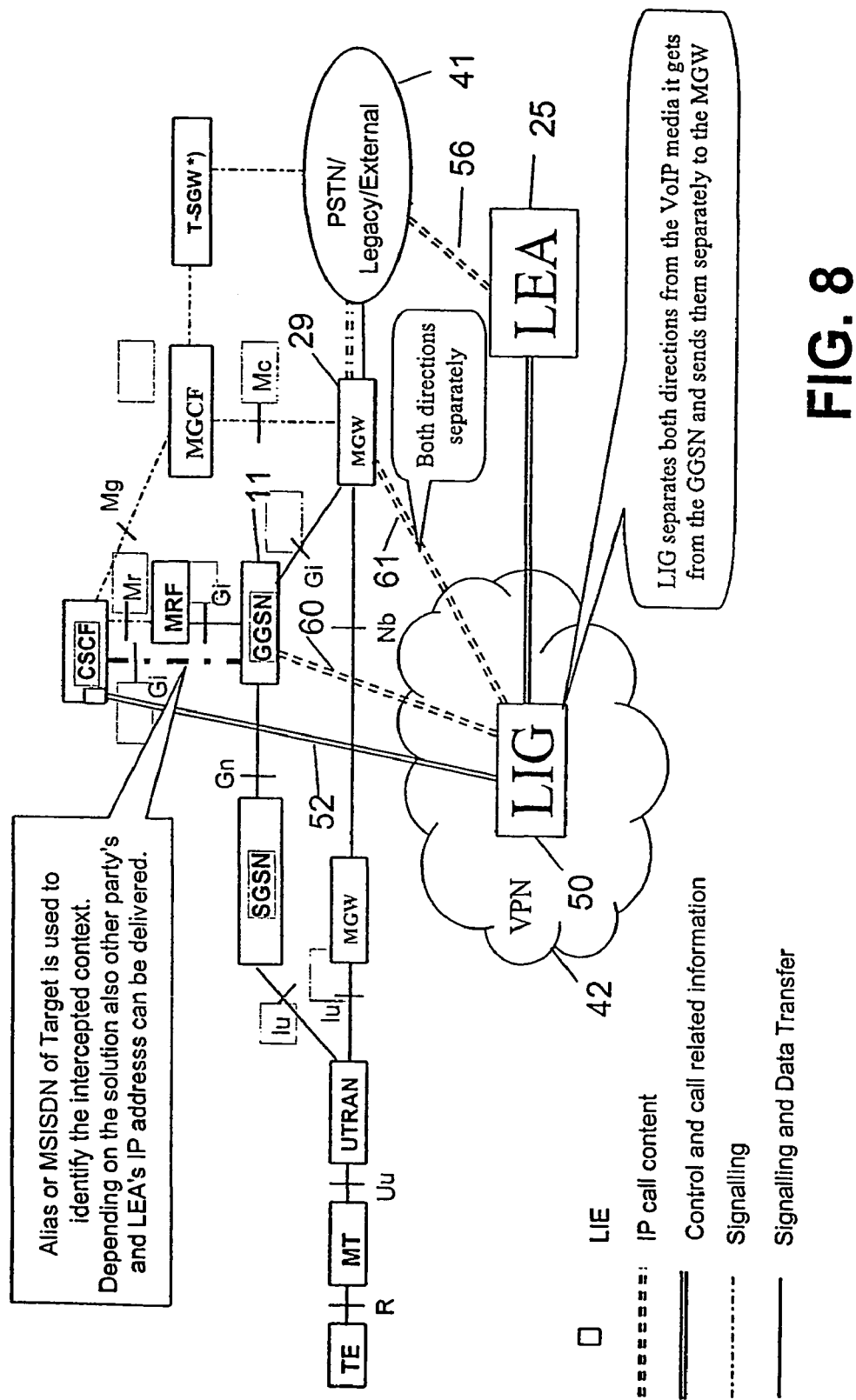
FIG. 8 illustrates an eighth embodiment of the present invention.
Figure 9:
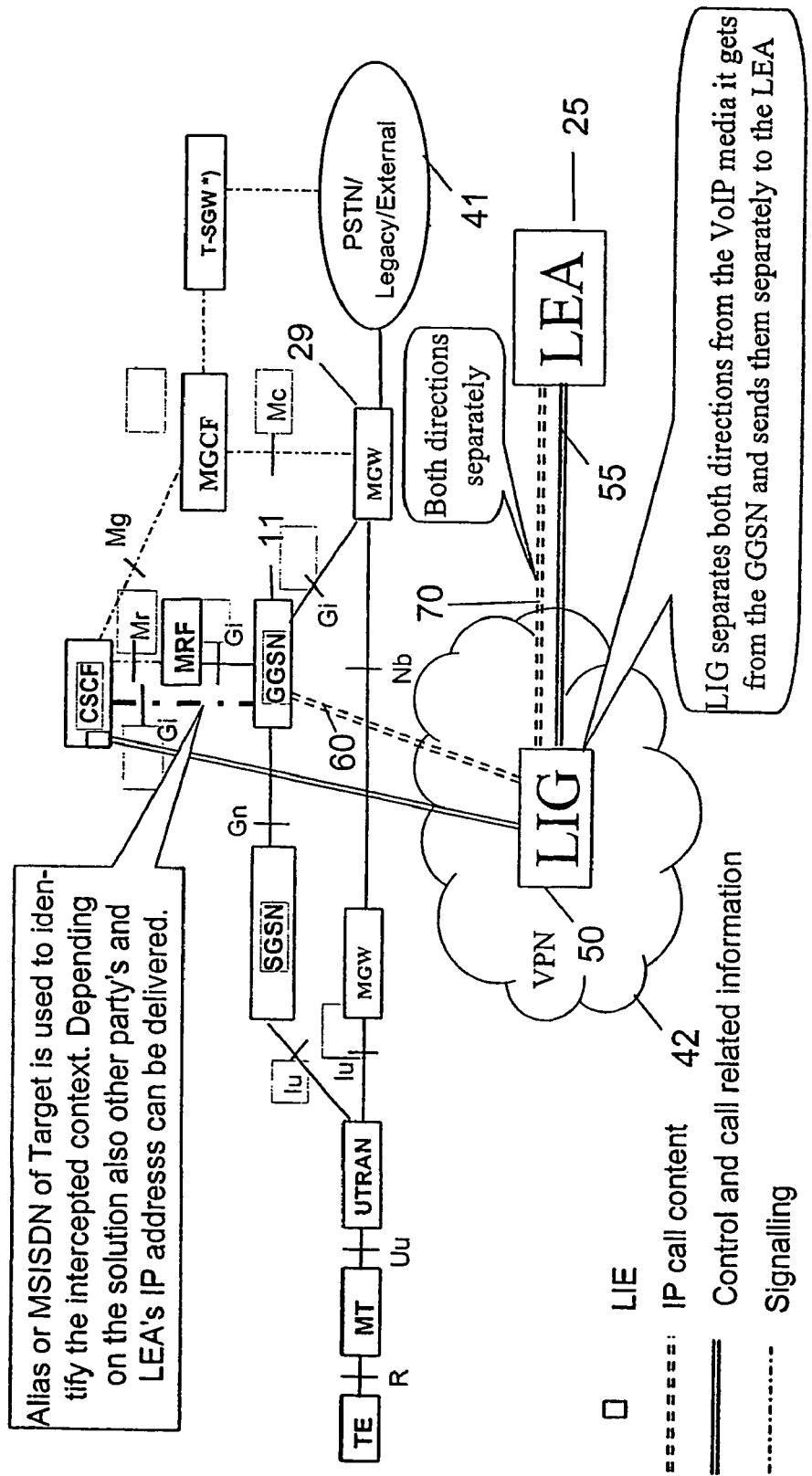
FIG. 9 illustrates a ninth embodiment of the present invention.
Figure 12:
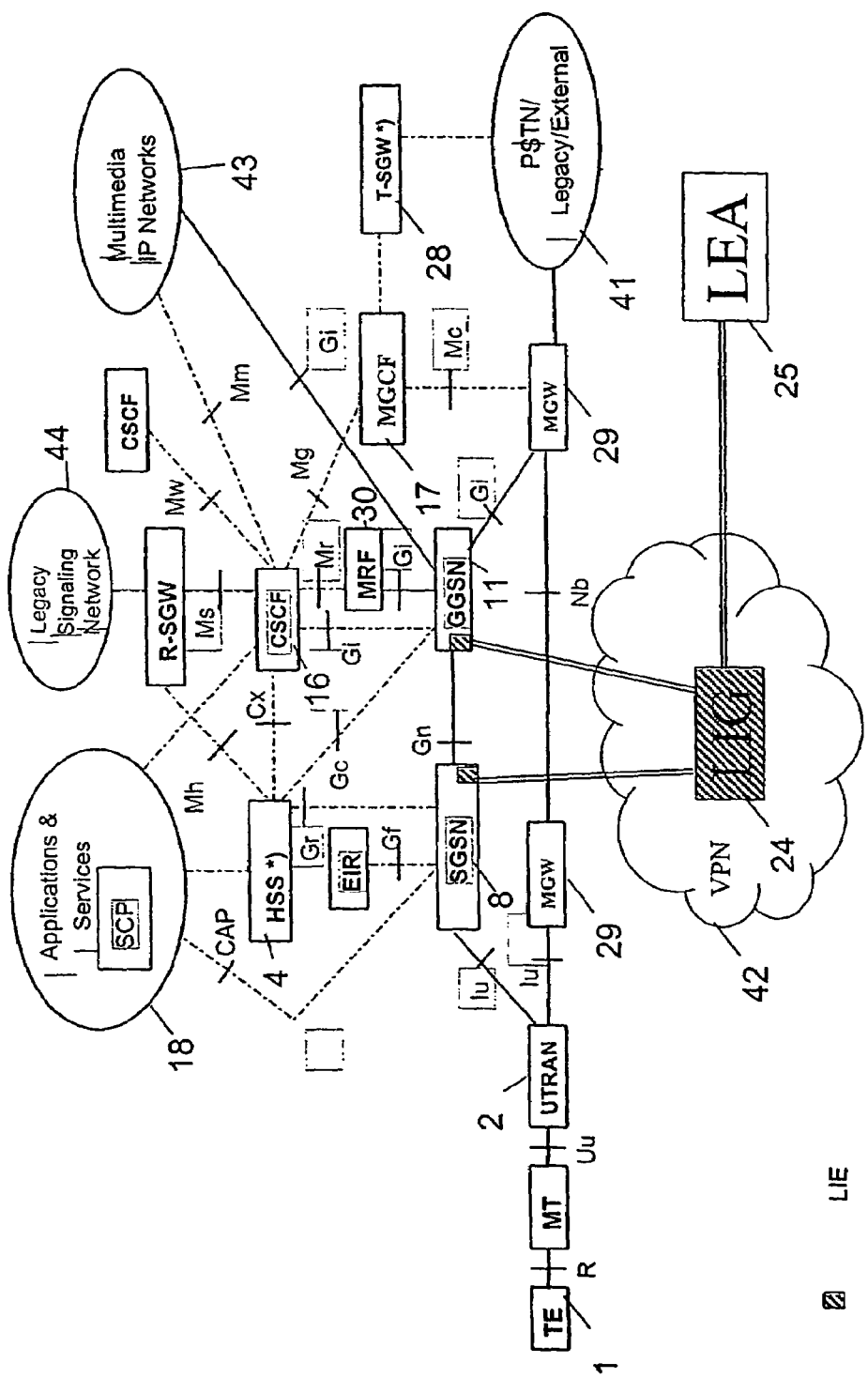
FIG. 12 illustrates a structure for lawful interception in a pure GPRS-based system according to the prior art.

FIGS. 7 to 9 illustrate three further embodiments which are structurally based on the configuration of components shown in FIG. 12. Components shown in FIG. 12 and not represented in the embodiments of FIGS. 7 to 9 (e.g. components 4, 18, 43, 44) are preferably likewise provided in the embodiments according to FIGS. 7 to 9 and are simply omitted for sake of clarity. In the structure shown in FIG. 12, only signaling information can be reported. Contrary thereto, in accordance with the embodiments shown in FIGS. 7 to 9 three alternatives of VoIP interception are shown which use the Gi interface between CSCF 16 and GGSN 11 (and/or SGSN 8).

In the embodiment shown in FIG. 7, the alias or MSISDN of the target to be intercepted is used to identify the context to be intercepted. The target alias or MSISDN is preferably sent from CSCF 16 to GGSN 11 via the Gi interface. It is also possible to deliver the IP address of the other party communicating with the party to be intercepted, and/or the IP address of LEA 24 from CSCF 16 to GGSN 11 via the Gi interface. This information flow is shown in FIG. 7 as well as in FIGS. 8 and 9 by a dot-and-dash line referenced 51 in FIG. 7. Therefore, GGSN 11 can pick the alias or MSISDN of the interception target, and eventually also the IP address of the other party communicating with the target, and/or of LEA 24 from the Gi interface. The CSCF 16 further communicates, in all embodiments shown in FIGS. 7 to 9, with a lawful interception gateway 50 via an information flow, link or channel 52 which transmits control and call related information. The LIG 50 may be provided in a virtual private network (VPN) 42 and may transmit and/or receive control and call-related information to and from LEA 24 via an information flow channel, link, etc. 55. These features likewise apply to the embodiments shown in FIGS. 8 and 9.

According to the embodiment of FIG. 7, the IP call content represented by double-broken lines 53, 54, 56 is transmitted from GGSN 11 to LEA 24 via media gateway 29 and PSTN/legacy/external network 41. Both directions of information flow between the target and the other party may be separated and separately copied and transmitted to LEA 24.

In FIGS. 7 to 9, the signalling flow is represented by a single dot-and-dash line whereas signaling and data transfer is represented by single solid lines.

FIG. 8 illustrates a further embodiment having essentially the same structural arrangement as the embodiment of FIG. 7. In the embodiment of FIG. 8, the GGSN 11 is adapted to send the VoIP content directly to the LIG 50. The LIG 50 separates both directions from the VoIP media streams it receives from GGSN 11 and sends them separately to the media gateway 29 for further transmission to the other party communicating with the target to be intercepted and for copying it to LEA 24 (via information flow link 56). The information flow between GGSN 11, LIG 50 and MGW 29 is represented by double-broken lines 60, 61. Similar to the embodiment of FIG. 7, the target IP address is used to identify the intercepted context in the embodiment of FIGS. 8 and 9.

FIG. 9 illustrates a further embodiment having a structure similar to the structures of the embodiments of FIGS. 7 and 8. According to FIG. 9, the GGSN 11 is sending the VoIP content to the LIG 50 as represented by link or channel 60. The LIG 50 separates both directions from the VoIP media stream it receives from GGSN 11 and sends them separately to the LEA 24, as represented by information flow 70. The GGSN 11 may send the VoIP content to the other party communicating with the target to be intercepted in the customary manner, e.g. via MGW 29.

According to the embodiments shown in FIGS. 8 and 9, the GGSN 11 may receive the IP address of LIG 50 from the Gi interface to CSCF 16.

Figure 10:
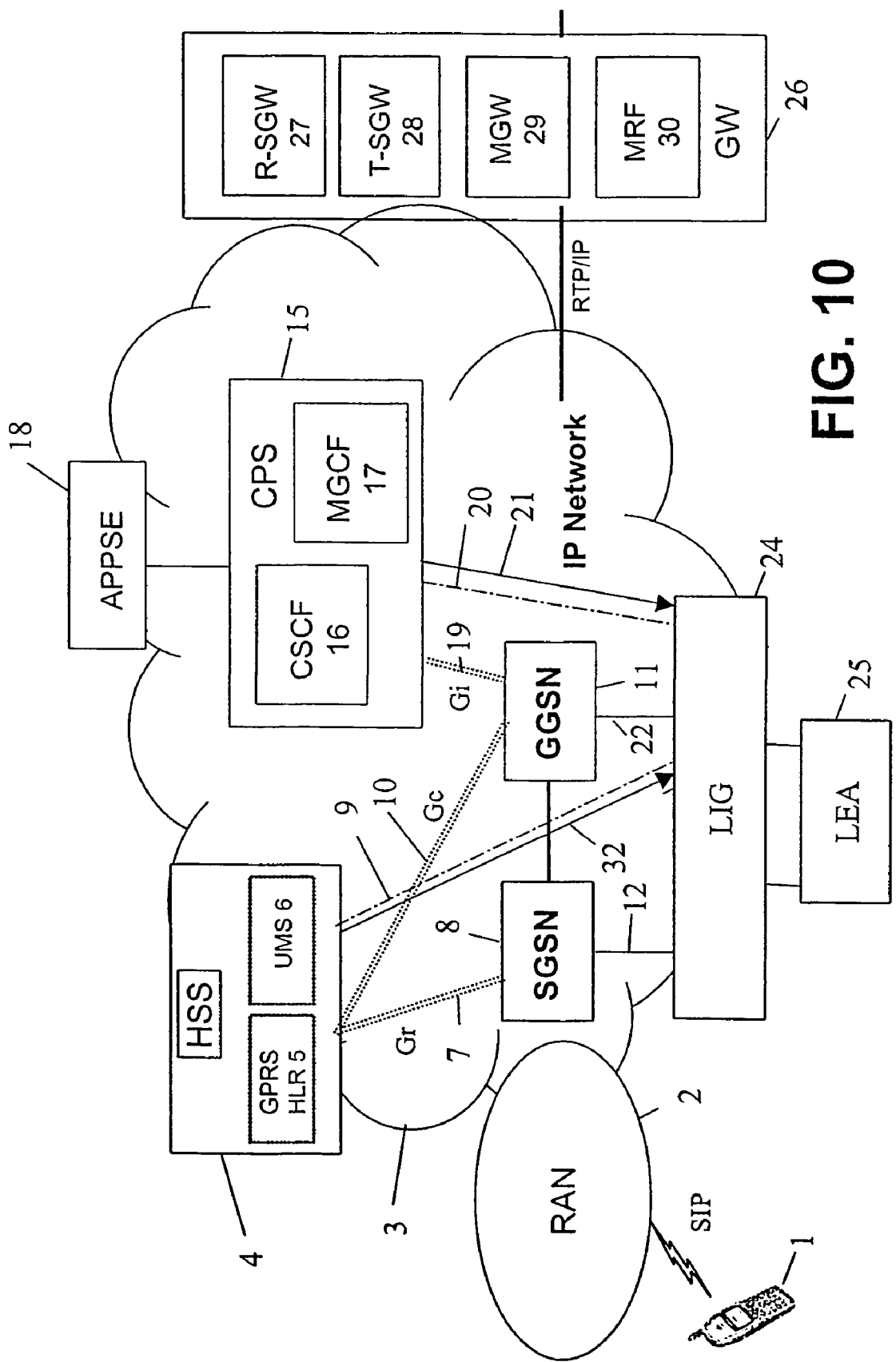
FIG. 10 illustrates a tenth embodiment of the present invention.

FIG. 10 illustrates a further embodiment of the present invention. In this embodiment, only the LIG 24 of the Control plane vendor is needed. To ensure CC content delivery to the LIG IPT identity or LI trigger (and PDP context ID), the delivery address (or addresses) of the LIG 24 and possible correlation ID are carried from HSS 4 to SGSN 8 and GGSN 11 via Gr and Gc, and from CPS 15 to GGSN 11 via Gi interface. Note that the trigger in the Gi interface can be only the alias or MSISDN (only they are known to the CPS 15).

HSS 4, CPS 15 and LIG 24 preferably are from the same vendor so as to ensure good compatibility, and are in the same VPN.

The Charging ID may be used as a correlation information with user identity (e.g. IPT identity). Otherwise also correlation ID may be standardised to the Gr, Gc and Gi interfaces. Also delivery address(es) of the LIG 24 is preferably standardised to the interfaces.

LIG 24 controls triggers in the HSS 4 and in the CPS 15 (i.e. delivers IPT identities activation information and LIG's delivery addresses). IRI information can be sent to the LIG 24 also from the HSS 4 if it is needed. Such an information can be e.g. location information if it is not known in CPS 15.

HSS 4 will trigger the interception from the IPT identity. HSS 4 can generate the LI trigger (e.g. IMSI) from all IPT identities but at least the trigger from alias (user@domain) is needed. HSS 4 will send the LI trigger to the SGSN 8 and GGSN 11 directly (via Gr, Gc). CPS 15 will trigger the interception e.g. in case of terminated or forwarded party being a target for interception and will send trigger key (alias or MSISDN) to the GGSN 11.

IRIs are produced from the control plane (HSS and CPS). LI trigger related (trigger in Gr, Gc and Gi) CC will be delivered to the LIG 24.

Figure 11:
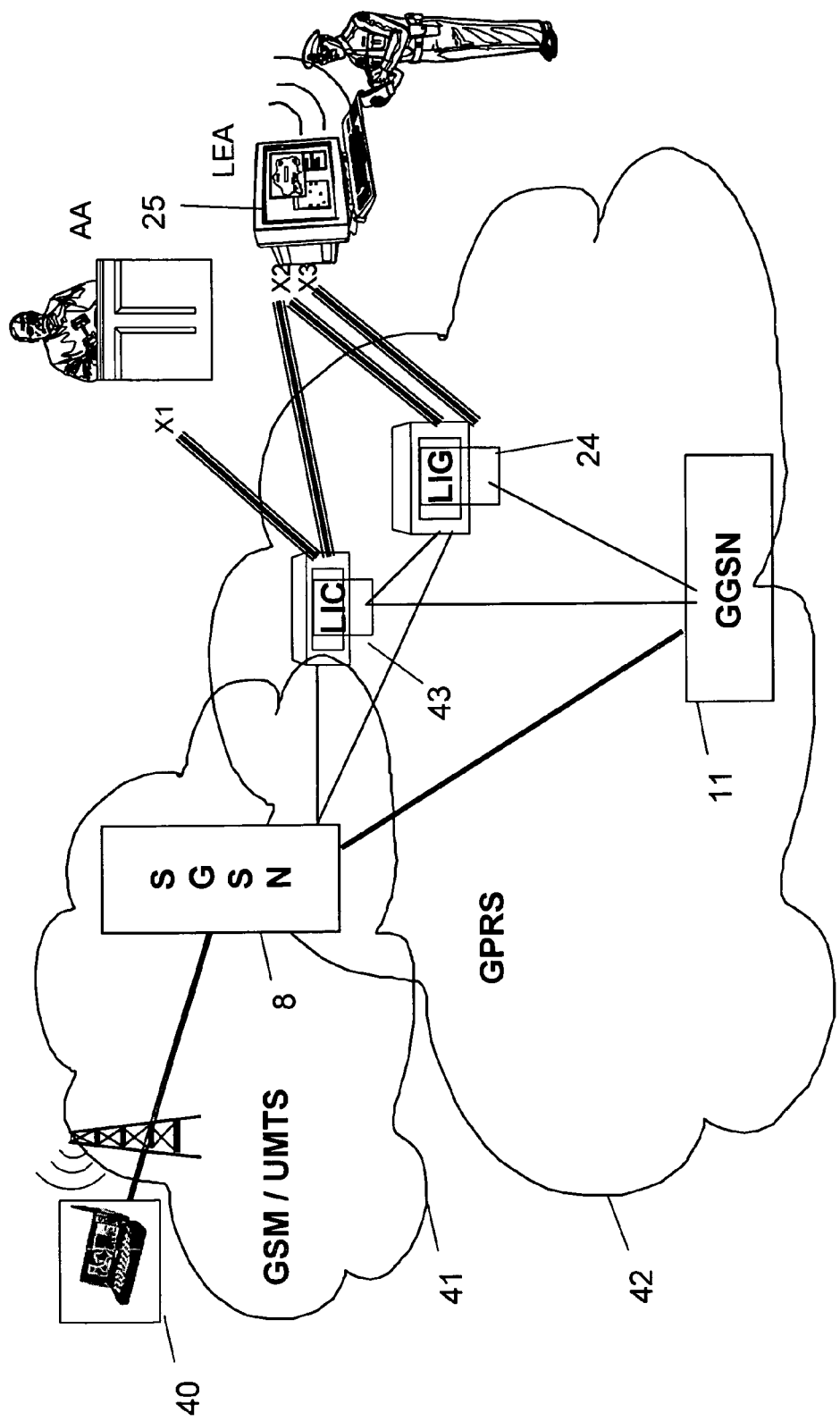
FIG. 11 illustrates another embodiment of the present invention.

FIG. 11 shows another embodiment of the present invention.

This embodiment illustrates some methods to ease the implementation and to provide more throughput to the Lawful Interception.

A problem in VoIP is not only the data collection but also the interpretation of the collected data. When VoIP call goes through GPRS or any other data network it can be captured normally using IMSI, IMEI or MSISDN as target. This embodiment uses e.g. a standard data collection and introduces several different interpretation methods.

In VoIP lawful interception the voice is digital and transmitted in packets. Combining these packets stream to listenable audio stream needs special software and hardware.

This problem might be solved by providing a new element that converts the intercepted voice packet streams to circuit switched (CS) data streams. These CS data streams could then be routed to LEA (lawful enforcement authorities).

In accordance with the present embodiment of the invention, the interpretation and storing of the VoIP interception product is transferred to LEAs. Advantages of the implementation in accordance with the present embodiment include the reduction of the amount of needed network elements. Further, the throughput of the delivery is better because there is no interpretation or format change for the intercepted product.

The decoding back to voice occurs at LEA site with the machines thereof and using their capacity. The load is this way also distributed to the users.

The LEAs can play back and forth the intercepted content with an appropriate program such as Windows Multimedia Player just as easy as with a normal tape recorder.

The solution uses existing systems so that no new machines are needed. No switched circuit capacity problems occur at delivery interfaces. No unnecessary encoding/decoding takes place in the network.

In the following, some alternative solutions are presented:

The data is collected and processed to known voice file formats (e.g. wav, mp3, au) at LIB (Lawful interception Browser, DF2 in ETSI terminology) or at LEAs machine. Normally the LEAs machine is a personal computer that contains www browser which has means of playing the standard audio files. The police authority (LEA) may then study this intercepted data just by playing the files and listening to the voice from computers speakers.

As an alternative, the data is processed to real audio stream and delivered in realtime to the listening sites. The person or equipment at LEA may the connect to these stream and listen to the intercepted VoIP call.

In an alternative solution, the data exists already in coded compact format which can be transformed to audible form by a special new plug-in module for the browsers. This alternative introduces a new audio data format for the browsers but uses as much as possible the already coded VoIP data.

The embodiment shown in FIG. 11 comprises a user equipment 40 which may be similar to element 1 and conducts a call to be intercepted. The call is connected through a GSM or UMTS network 41 and further through a GPRS network 42 which may be an IP-based network. The signaling and user traffic of the call is handled by a SGSN 8 and an GGSN 11, similar to the above described embodiments.

The network 42 includes a LIC (Lawful Interception Controller) 43 and a LIB (Lawful Interception Browser) 44. An authorised person or equipment such as a jugde instructs the LIC 43 to perform LI of calls/connections of the user of equipment 40. The LIC 43 sends instructions and information to the LIB 44 for intercepting the traffic, i.e. the call content of connections of the equipment 40. The LIB 44 sends the detected call content packets to the LEA 25 which interprets the packets for transforming them into audible form.

Whereas the embodiments of FIGS. 1 to 10 are mainly directed to the manner of implementing the interception of VoIP on the system level, that means from where the intercepted content is collected, the embodiment of FIG. 11 is mainly directed to the processing of CC (Communication-Content) data by collecting or listening with browser. The voice information is not passed to the LEA in analog form. In practise the advantage of this invention is that a digital internet based application format may be used so that for LEA users it is easy to find programs. One of the advantages of this invention is that it makes coding/decoding easier, and actually transfers coding to LEA.

The functioning and/or structure of the embodiment of FIG. 11 as shown and described above, can be integrated into, or combined with, any of the embodiments of FIGS. 1 to 10.

Although the invention has been described above with reference to specific embodiments, the invention intends to cover other embodiments as well which represent combinations of the above features, omissions, amendments, alternatives etc.

The invention claimed is:

1. An apparatus, comprising:
control circuitry configured to handle signalling of a connection between a user equipment and a communication device, wherein the connection comprises an internet telephony connection; a receiver configured to receive, from a lawful interception gateway, an identity of a target to be intercepted, said identity being not recognizable for a support element or network element for performing interception of the connection; a processor configured to recognize the connection to be intercepted on the basis of the identity, to map the identity of the target to be intercepted to a transport level identity, said transport level identity being recognizable for a support element or network element for performing interception of the connection, and to generate interception information to inform a support element or a network element of an identification of the connection with the target to be intercepted on the basis of the mapped transport level identity; and a transmitter configured to send signalling traffic, related to the connection with the target to be intercepted, to a support element or a lawful interception gateway, wherein said signalling traffic is configured to trigger interception of the connection to be intercepted and comprises the interception information to identify the connection to be intercepted on the basis of the mapped transport level identity and identifies a correlation between interception-related information from a control plane and content of communication from a user plane, wherein the interception information transmitted to the support element or network element indicates an address of the lawful interception gateway and wherein the apparatus comprises one of a call processing server, call state control function, and home subscriber server, wherein the interception-related information from the control plane and the content of communication from the user plane are correlated by using one of a correlation identity and a call-related identity, wherein the correlation identity comprises one of a charging identity and a correlation identity, wherein the correlation identity is configured to be delivered to the support element or network element with a lawful interception trigger, and wherein the call-related identity is used in the control plane and a user plane for charging purposes.

2. The apparatus according to claim 1, wherein said apparatus is operationally coupled by an interface to the support element and is configured to transmit the interception information via the interface.

3. The apparatus according to claim 2, wherein the interface comprises one of a Gi, Gc and Gr interface.

4. The apparatus according to claim 1, wherein the interception information transmitted to the support element indicates an address of the target to be intercepted.

5. The apparatus according to claim 1, wherein the interception information transmitted to the support element indicates an address of a party connected to the target to be intercepted.

6. The apparatus according to claim 1, wherein the interception information transmitted to the support element indicates an address, of one of a law enforcement agency and law enforcement monitoring function.

7. The apparatus according to claim 1, wherein the connection to be intercepted comprises a voice over internet protocol media connection.

8. The apparatus according to claim 1, wherein an authorized interception agency is configured for interpretation and storing of the intercepted traffic information content.

9. The apparatus according to claim 1, wherein data from the traffic information configured to collected and processed to a voice file format at one of a lawful interception browser and at a machine of a law enforcement agency.

10. The apparatus according to claim 1, wherein data from the traffic information is processed to audio stream and delivered in real-time to a monitoring site.

11. The apparatus according to claim 1, wherein data from the traffic information exists in coded compact format and is transformed to audible form by a browser module.

12. The apparatus according to claim 1, wherein the apparatus is operationally coupled via an intercept-related information link to the lawful interception gateway.

13. A method, comprising:
receiving, from a lawful interception gateway, an identity of a target to be intercepted, said identity being not recognizable for a support element or network element for performing interception of a connection, wherein the connection comprises an internet telephony connection;
recognizing the connection to be intercepted on the basis of the identity, mapping the identity of the target to be intercepted to a transport level identity, said transport level identity being recognizable for a support element or network element for performing interception of the connection, and generating, via a controller configured to handle signalling of the connection between a user equipment and a communication device, interception information for informing one of a support element and a network element on an identification of the connection with the target to be intercepted on the basis of the mapped transport level identity; forwarding the interception information to a support element or a network element; and
sending signalling traffic, related to the connection with the target to be intercepted, to a lawful interception gateway, wherein said signalling traffic is configured to trigger interception of the connection to be intercepted and comprises the interception information to identify the connection to be intercepted on the basis of the mapped transport level identity and identifies a correlation between interception-related information from a control plane and content of communication from a user plane: wherein the interception information forwarded to the support element or network element indicates an address of the lawful interception gateway, and
wherein the controller comprises one of a call processing sender, call state control function, and home subscriber server; and correlating the interception-related information from the control plane and the content of communication from the user plane using one of a correlation identity and a call-related identity, wherein the correlation identity comprises one of a charging identity and a correlation identity, delivered to the support element or network element with a lawful interception trigger, and wherein the call-related identity is used in the control plane and the user plane for charging purposes.

14. The method according to claim 13, wherein the controller is operationally coupled via an interface to the support element and is configured to transmit the interception information via the interface.

15. The method according to claim 14, wherein the interface comprises one of a Gi, Gc and Gr interface.

16. The method according to claim 13, wherein the interception information transmitted to the support element indicates an address of the target to be intercepted.

17. The method according to claim 13, wherein the interception information transmitted to the support element indicates an address of a party connected to the target to be intercepted.

18. The method according to claim 13, wherein the interception information transmitted to the support element indicates an address of one of a law enforcement agency and law enforcement monitoring function, the support element being configured to send copies of data traffic to or from the target to be intercepted to the indicated address.

19. The method according to claim 13, wherein the connection to be intercepted comprises a voice over internet protocol media connection.

20. The method according to claim 13, wherein the data is collected and processed to a voice file format at one of a lawful interception browser and at a machine of a law enforcement agency.

21. The method according to claim 13, wherein the data is processed to an audio stream and delivered in real-time to a monitoring site.

22. The method according to claim 13, wherein the data is in a coded compact format and is transformed to audible form from the controller via a browser module.

23. The method according to claim 13, wherein the controller is operationally coupled via an intercept-related information link to the lawful interception gateway.

24. An apparatus, comprising:
a transmitter configured to transmit, to a lawful interception gateway element, traffic information transmitted between a user equipment and a communication device,
wherein the apparatus is configured to receive interception information which indicates an address of the lawful interception gateway,
wherein the interception information is based on a transport level identity mapped from an identity, said transport level identity being recognizable for the apparatus for performing interception of a connection, and said identity being not recognizable for the apparatus for performing interception of the connection, and wherein the apparatus is configured to send copies of data traffic to or from a target to be intercepted to the indicated address, and wherein the traffic information is configured to enable the lawful interception gateway to separate both directions of a media to and from the target to be intercepted and to forward them separately to a media gateway or law enforcement agency or law enforcement monitoring function, wherein intercepted related information from a control plane and content of communication from a user Plane are correlated by using one of a correlation identity and a call-related identity, wherein the correlation identity comprises a charging identity delivered to the apparatus with a lawful interception trigger, and wherein the call-related identity is used in the control plane and a user plane for charging purposes.

25. The apparatus according to claim 24, wherein the apparatus comprises one of a serving support node and a gateway support node.

26. The apparatus according to claim 24, wherein the apparatus comprises one of a serving general packet radio service support node and a gateway general packet radio service support node.

27. The apparatus according to claim 24, wherein the apparatus is configured to send copies of the data traffic to a media gateway for forwarding the traffic to the one of the law enforcement agency and the law enforcement monitoring function.

28. The apparatus according to claim 24, wherein the apparatus is configured to send copies of data traffic to or from the target to be intercepted to the indicated address.

29. The apparatus according to claim 24, wherein the apparatus is configured to separate both directions of the media to and from the target to be intercepted and to forward them separately to one of a media gateway, law enforcement agency, and law enforcement monitoring function.

30. The apparatus of claim 24 wherein the support element is operationally coupled via a control link to the lawful interception gateway.

31. A computer readable medium comprising computer executable instructions to implement a method comprising:
receiving, from a lawful interception gateway, an identity of a target to be intercepted, said identity being not recognizable for a support element or network element for performing interception of a connection, wherein the connection comprises an internet telephony connection; recognizing the connection to be intercepted on the basis of the identity, mapping the identity of the target to be intercepted to a transport level identity, said transport level identity being recognizable for a support element or network element for performing interception of the connection, and generating, via a controller configured to handle signalling of a connection between a user equipment and a communication device, interception information for informing one of the support element and a network element on an identification of the connection with the target to be intercepted on the basis of the mapped transport level identity; forwarding the interception information to a support element or a network element; and sending signalling traffic, related to the connection with the target to be intercepted, to a support element or a lawful interception gateway, wherein said signalling traffic is configured to trigger interception of the connection to be intercepted and comprises the interception information to identify the connection to be intercepted on the basis of the mapped transport level identity and identifies a correlation between interception-related information from a control plane and content of communication from a user plane;

wherein the interception information forwarded to the support element or network element indicates an address of the lawful interception gateway, and wherein the controller comprises one of a call processing sender, call state control function, and home subscriber sender, wherein the method further comprises correlating the interception-related information from the control plane and the content of communication from the user plane using one of a correlation identity and a call-related identity, wherein the correlation identity comprises one of a charging identity and a correlation identity, delivered to the support element or network element with a lawful interception trigger, and wherein the call-related identity is used in the control plane and the user plane for charging purposes.

32. A method, comprising:
transmitting, at a support element, to a lawful interception gateway element, traffic information transmitted between a user equipment and a communication device;
receiving, at the support element, interception information, wherein the interception information indicates an address of the lawful interception gateway,
wherein the interception information is based on a transport level identity mapped from an identity, said transport level identity being recognizable for the support element for performing interception of a connection, and said identity being not recognizable for the support element for performing interception of the connection; and
sending copies of data traffic to or from a target to be intercepted to the indicated address,
wherein the traffic information is configured to enable the lawful interception gateway to separate both directions of a media to and from the target to be intercepted and to forward them separately to a media gateway or law enforcement agency or law enforcement monitoring function, wherein intercepted related information from a control plane and content of communication from a user plane are correlated by using one of a correlation identity and a call-related identity
wherein the correlation identity comprises a charging identity delivered to the support element with a lawful interception trigger, and
wherein the call-related identity is used in the control plane and a user plane for charging purposes.

* * * * *

UNITED STATES PATENT AND TRADEMARK OFFICE
CERTIFICATE OF CORRECTION

| | |
|---|---|
| PATENT NO. | : 7,620,389 B2 |
| APPLICATION NO. | : 10/477630 |
| DATED | : November 17, 2009 |
| INVENTOR(S) | : Seppo Kallio et al. |

It is certified that error appears in the above-identified patent and that said Letters Patent is hereby corrected as shown below:

Title page and Col. 1

Applicant inadvertently failed to notice the misspelled title during prosecution.

--Please correct the title of the issue patent to read METHOD AND SYSTEM ALLOWING LAWFUL INTERCEPTION OF CONNECTIONS SUCH AS VOICE-OVER-INTERNET PROTOCOL CALLS--

Signed and Sealed this

Twenty-third Day of March, 2010

David J. Kappos
*Director of the United States Patent and Trademark Office*